(12) United States Patent
Huang et al.

(10) Patent No.: US 12,166,226 B2
(45) Date of Patent: *Dec. 10, 2024

(54) BATTERY PACK AND VEHICLE

(71) Applicant: CONTEMPORARY AMPEREX TECHNOLOGY (HONG KONG) LIMITED, Fujian (CN)

(72) Inventors: Haihua Huang, Fujian (CN); Wumei Fang, Fujian (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 224 days.

This patent is subject to a terminal disclaimer.

(21) Appl. No.: 17/736,159

(22) Filed: May 4, 2022

(65) Prior Publication Data

US 2022/0263180 A1    Aug. 18, 2022

Related U.S. Application Data

(63) Continuation of application No. 17/488,472, filed on Sep. 29, 2021, now Pat. No. 11,387,519, which is a
(Continued)

(30) Foreign Application Priority Data

Oct. 15, 2019    (CN) .......................... 201910975573.9

(51) Int. Cl.
*H01M 50/249*    (2021.01)
*B60L 50/64*    (2019.01)
(Continued)

(52) U.S. Cl.
CPC ........... *H01M 50/249* (2021.01); *B60L 50/64* (2019.02); *H01M 50/209* (2021.01);
(Continued)

(58) Field of Classification Search
CPC ............. H01M 50/249; H01M 50/209; H01M 50/289; H01M 50/3425; H01M 50/358;
(Continued)

(56) References Cited

U.S. PATENT DOCUMENTS

| 8,299,801 B2 | 10/2012 | Yano et al. |
| 8,674,703 B2 | 3/2014 | Yano et al. |

(Continued)

FOREIGN PATENT DOCUMENTS

| CN | 101662054 A | 3/2010 |
| CN | 101685898 A | 3/2010 |

(Continued)

OTHER PUBLICATIONS

English Translation of JP2012/101663.*
(Continued)

*Primary Examiner* — Kiran Quraishi Akhtar
(74) *Attorney, Agent, or Firm* — Scully, Scott, Murphy & Presser, P.C.

(57) ABSTRACT

A battery pack is provided. The battery pack includes a first partition piece, a battery row, and a shielding member. The first partition piece is located between two batteries adjacent to each other in a first direction in the battery row. An upper surface of the first partition piece is lower than an upper surface of a top cover. A recess is formed between the battery row and the first partition piece. The shielding member includes a first shielding portion and a second shielding portion. The first shielding portion overlays all explosion-proof valves of the battery row. A passage is disposed between the first shielding portion and the upper surface of the battery row. The passage is configured to guide a fluid to flow along the first direction and is provided with a downward opening. The second shielding portion closes off a part of the opening facing the recess directly.

12 Claims, 2 Drawing Sheets

Related U.S. Application Data continuation of application No. PCT/CN2020/119080, filed on Sep. 29, 2020.

(51) Int. Cl.
*H01M 50/209* (2021.01)
*H01M 50/289* (2021.01)
*H01M 50/342* (2021.01)
*H01M 50/358* (2021.01)

(52) U.S. Cl.
CPC ..... *H01M 50/289* (2021.01); *H01M 50/3425* (2021.01); *H01M 50/358* (2021.01); *H01M 2220/20* (2013.01)

(58) Field of Classification Search
CPC .......... H01M 50/291; H01M 2220/20; H01M 50/342; B60L 50/64; Y02E 60/10; Y02T 10/70
See application file for complete search history.

(56) References Cited

U.S. PATENT DOCUMENTS

| | | | |
|---|---|---|---|
| 9,425,447 B2 | 8/2016 | Fritz et al. | |
| 9,553,289 B2 | 1/2017 | Lee et al. | |
| 9,722,222 B2 | 8/2017 | Kim et al. | |
| 10,211,434 B2 | 2/2019 | Ichikawa et al. | |
| 2009/0142650 A1 | 6/2009 | Okada et al. | |
| 2010/0073005 A1 | 3/2010 | Yano et al. | |
| 2012/0114993 A1 | 5/2012 | Park et al. | |
| 2012/0319695 A1 | 12/2012 | Yano et al. | |
| 2013/0002017 A1 | 1/2013 | Yano et al. | |
| 2014/0045007 A1 | 2/2014 | Fritz et al. | |
| 2014/0322566 A1* | 10/2014 | Kim | H01M 50/271 429/82 |
| 2015/0030894 A1* | 1/2015 | Lee | H01M 50/209 429/72 |
| 2015/0132618 A1* | 5/2015 | Han | H01M 50/581 429/53 |
| 2018/0034014 A1* | 2/2018 | Ichikawa | H01M 10/0413 |
| 2022/0059902 A1 | 2/2022 | Jiang et al. | |

FOREIGN PATENT DOCUMENTS

| | | | |
|---|---|---|---|
| CN | 103579544 A | 2/2014 | |
| CN | 104347833 A | 2/2015 | |
| CN | 105280845 A | 1/2016 | |
| CN | 107665962 A | 2/2018 | |
| CN | 109742281 A | 5/2019 | |
| CN | 209104230 U | 7/2019 | |
| CN | 209183604 U | 7/2019 | |
| JP | 2011129372 A | 6/2011 | |
| JP | 2012/101663 * | 5/2012 | ............. Y02E 60/10 |
| JP | 2012101663 A | 5/2012 | |
| JP | 2013114952 A | 6/2013 | |
| JP | 2013218790 A | 10/2013 | |
| JP | 2015041595 | 3/2015 | |
| JP | 2015230827 A | 12/2015 | |
| JP | 2017037753 A | 2/2017 | |
| JP | 2017098014 A | 6/2017 | |
| JP | 2018202946 A | 12/2018 | |

OTHER PUBLICATIONS

International Search Report dated Jan. 4, 2021 issued in PCT/CN2020/119080.
Written Opinion dated Jan. 4, 2021 issued in PCT/CN2020/119080.
Office Action dated Nov. 24, 2021 received in U.S. Appl. No. 17/488,472.
Notice of Allowance dated Feb. 16, 2022 received in U.S. Appl. No. 17/488,472.
Extended European Search Report dated May 6, 2022 received in European Patent Application No. EP 20877580.9.
Decision to Grant a Patent dated Oct. 31, 2022 received in Japanese Patent Application No. JP 2022-523013.

* cited by examiner

BATTERY PACK AND VEHICLE

CROSS-REFERENCE TO RELATED APPLICATIONS

This application is a continuation of U.S. patent application Ser. No. 17/488,472, filed on Sep. 29, 2021, which is a continuation of International Application No. PCT/CN2020/119080, filed on Sep. 29, 2020. The International Application claims priority to Chinese Patent Application No. 201910975573.9, filed on Oct. 15, 2019. All of the aforementioned patent applications are hereby incorporated by reference in their entireties.

TECHNICAL FIELD

This application relates to the technical field of batteries, and in particular, to a battery pack and a vehicle.

BACKGROUND

With the boom of new energy vehicles, the demand for power battery products is increasing, and safety performance of battery products is more important.

Thermal runaway is a major problem that threatens the safety performance of the battery products. In a conventional battery pack, fireproof sponge usually overlays an upper part of a battery pack to temporarily slow down heat spread during thermal runaway. This serves a shielding function to some extent, but gives rise to a problem of poor air ventilation. Consequently, fluids such as gas and flames generated during the thermal runaway are unable to be expelled in time, thereby damaging the battery pack and even causing accidents.

SUMMARY

A technical issue of this application is to enhance safety performance of a battery pack.

To solve the technical issue, this application provides a battery pack, including:
- a box body, in which a cavity is disposed;
- a partition structure, disposed in the cavity and configured to partition the cavity into at least two accommodation regions, where the partition structure includes a first partition piece;
- a battery row, disposed in the accommodation regions, where the battery row includes a plurality of batteries arranged alongside in a first direction, explosion-proof valves are disposed on a top cover of the batteries, the first partition piece is located between two batteries adjacent to each other in the first direction in the battery row, an upper surface of the first partition piece is lower than an upper surface of the top cover in a height direction, a recess is formed between the battery row and the first partition piece, and the first direction is perpendicular to the height direction; and
- a shielding member, including a first shielding portion and a second shielding portion, where the first shielding portion overlays all the explosion-proof valves of the battery row, a passage is disposed between the first shielding portion and the upper surface of the battery row, the passage is configured to guide a fluid to flow along the first direction and is provided with a downward opening, and the second shielding portion closes off a part of the opening, the part facing the recess directly.

In some embodiments, the first shielding portion includes a body plate and two bent plates. The two bent plates are connected to two opposite ends of the body plate along a second direction respectively and are both bent downward against the body plate. The passage is located between the body plate, the two bent plates, and the upper surface of the battery row. The second direction is perpendicular to the first direction and the height direction.

In some embodiments, a cross section of the first shielding portion is in an inverted U shape.

In some embodiments, the second shielding portion includes a base plate. The base plate closes off a part of the opening, the part facing the recess directly.

In some embodiments, the second shielding portion further includes an extension plate. The extension plate extends upward from the base plate and is connected to the first shielding portion.

In some embodiments, the second shielding portion includes two extension plates. The two extension plates are connected to two opposite ends of the base plate along the second direction respectively and are both bent upward against the base plate. The two extension plates are both connected to the first shielding portion. The second direction is perpendicular to the first direction and the height direction.

In some embodiments, the two extension plates are connected to the two bent plates of the first shielding portion respectively.

In some embodiments, a cross section of the second shielding portion is in a U shape.

In some embodiments, the battery pack further includes a box cover. The box cover fits on a top of the box body. An explosion-proof exhaust structure is disposed on at least one of two opposite side plates of the box cover, the two side plates are opposite to each other in the first direction. The explosion-proof exhaust structure communicates with the passage and is configured to expel a fluid, which flows out of the passage, out of the battery pack.

In some embodiments, the explosion-proof exhaust structure includes an explosion-proof valve or a fragile portion. The fragile portion is a part of the side plate. A strength of the fragile portion is lower than that of other parts of the side plate.

In some embodiments, the battery pack further includes a box cover. The box cover fits on the top of the box body, and the first shielding portion is connected to the box cover.

In some embodiments, the partition structure further includes a second partition piece. The second partition piece intersects the first partition piece. The second partition piece and the first partition piece jointly partition the cavity into at least two accommodation regions.

Another aspect of this application further provides a vehicle. The vehicle includes a power source and the battery pack according to this application. The power source is configured to provide power to the vehicle, and the battery pack is configured to provide electrical power to the power source.

The second shielding portion disposed closes off a part of the downward opening of the passage, the part facing the recess directly. This application effectively prevents a fluid generated by thermal runaway from flowing into the recess, more reliably achieves directional expulsion of the thermal runaway fluid, and enhances safety performance of the battery pack.

BRIEF DESCRIPTION OF DRAWINGS

To describe the technical solutions in the embodiments of this application more clearly, the following outlines the drawings to be used in the description of the embodiments of this application. Apparently, the drawings outlined below are merely some embodiments of this application, and a person of ordinary skill in the art may derive other drawings from the outlined drawings without making any creative efforts.

REFERENCE NUMERALS

Figure 1:
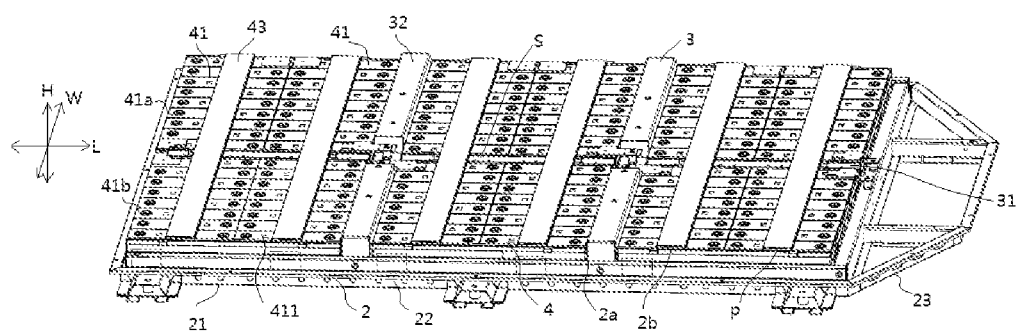
FIG. 1 is a schematic diagram of a three-dimensional structure of a box body, a partition structure, and a battery module in a battery pack according to an embodiment of this application.

1. Box cover; 11. Top plate; 12. Side plate; 121. Explosion-proof exhaust structure; 13. Flange;
2. Box body; 2a. Cavity; 2b. Accommodation region; 21. Bottom; 22. Lateral part; 23. Protruding portion;
3. Partition structure; 31. First partition piece; 32. Second partition piece;
4. Battery module; 41. Battery row; 41a. First battery row; 41b. Second battery row; 411. Battery; 411a. Top cover; 411b. Explosion-proof valve; 43. Shielding member; 431. First shielding portion; 431a. Body plate; 431b. Bent plate; 432. Second shielding portion; 432a. Base plate; 432b. Extension plate; and
P. Passage; O. Opening; S. Recess; H. Height direction; W. First direction; L. Second direction.

DETAILED DESCRIPTION OF EMBODIMENTS

The following clearly and fully describes the technical solutions in the embodiments of this application with reference to the drawings hereof. Apparently, the described embodiments are merely a part of but not all of the embodiments of this application. The following description of at least one exemplary embodiment is merely illustrative, and is in no way intended as a limitation on this application or the use thereof. All other embodiments derived by a person of ordinary skill in the art based on the embodiments of this application without making any creative efforts fall within the protection scope of this application.

The technologies, methods, and devices known to a person of ordinary skill in the related art may be described without going into details, but as appropriate, such technologies, methods, and device are regarded as a part of the granted specification.

Understandably, in the context of this application, the terms such as "first" and "second" used to qualify parts are merely intended for ease of distinguishing the parts. Unless otherwise specified, no special meaning is ascribed to such terms. Therefore, the terms are not to be understood as a limitation on the protection scope of this application.

In addition, the technical features mentioned in different embodiments of this application described below may be combined with each other so long as they do not conflict with each other.

FIG. 1 to FIG. 4 show a battery pack according to an embodiment of this application. In the illustrated embodiment, the battery pack is used as a power device of a vehicle, and is disposed on a vehicle body to provide electric power to the vehicle. In some embodiments, the vehicle may include: a power source that provides power to the vehicle; and a battery pack according to some embodiments. The battery pack is configured to provide power to the power source so as to provide electrical power to the vehicle. The vehicle may include an electric vehicle or a hybrid vehicle or the like. The electric vehicle may use an electric engine as a power source, where the electric engine is powered by electrical energy output from the battery pack. The electric vehicle may provide electrical power to the electric engine by using a battery pack according to some embodiments, may use the battery pack as an active power source and/or a standby power source. The hybrid power vehicle may provide power by using two or more types of power sources such as an internal combustion engine and an electric motor.

For clear description of directions and positions hereinafter, a coordinate system in FIG. 1 defines the directions of the battery pack. A coordinate axis H represents a height direction of the battery pack, and is also a height direction of an accommodation box and a battery 411 in the accommodation box. The coordinate axis W is perpendicular to the coordinate axis H, and is referred to as a first direction, and represents a width direction of the battery pack. The coordinate axis L is perpendicular to the coordinate axis H and the coordinate axis W, and is referred to as a second direction, and represents a length direction of the battery pack.

Based on the foregoing definitions of directions, all the terms used in the following description to indicate a direction or a position relationship, such as "up", "down", "top", and "bottom", are used with reference to the height direction H. A box cover 1 and a box body 2 of the battery pack are arranged relative to each other in the height direction H. A direction from the box body 2 to the box cover 1 is an upward direction, and a direction from the box cover 1 to the box body 2 is a downward direction.

However, understandably, such definitions of directions and positions are merely intended for ease or brevity of description of this application. Unless otherwise specified to the contrary, such directional terms do not indicate or imply that the indicated device or component is necessarily in the specified direction or necessarily constructed or operated in the specified direction. Therefore, such terms are not to be understood as a limitation on the protection scope of this application.

As shown in FIG. 1 to FIG. 4, the battery pack according to this embodiment includes an accommodation box, a battery module 4, and the like.

The accommodation box is configured to accommodate a battery module 4 and the like, and provide protection for the battery module 4 inside. As shown in FIG. 1 and FIG. 2, in this embodiment, the accommodation box includes a box body 2 and a box cover 1. A cavity 2a is disposed in the box body 2 configured to accommodate the battery module 4 and the like. The cavity 2a is open on the top, so as to facilitate mounting and removal of the battery module 4. The box cover 1 fits on the top of the box body 2 to close off the cavity 2a. The box cover 1 may hermetically fit the box body 2. For example, a sealing element such as a sealing ring may be disposed between the box cover 1 and the box body 2.

Figure 2:
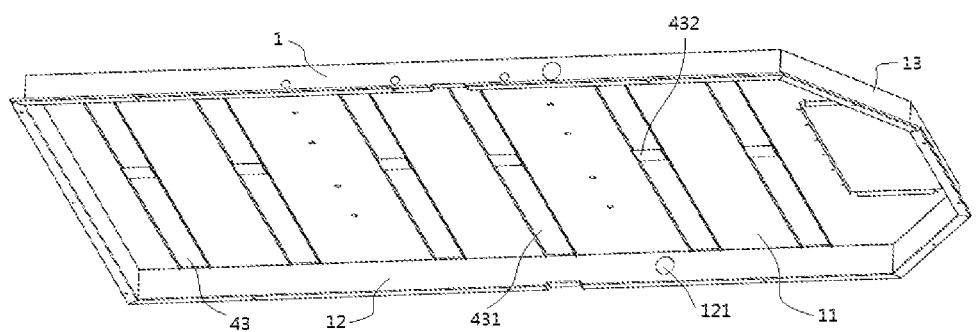
FIG. 2 is a schematic bottom view of a structure of a box cover and a shielding member in a battery pack in the embodiment shown in FIG. 1.

As can be seen from FIG. 1, the box body 2 includes a bottom 21, a lateral part 22, and a protruding portion 23. The lateral part 22 and the bottom 21 together define the cavity 2a. The lateral part 22 is connected a circumference of the bottom 21 and extends upward. The protruding portion 23 is connected to one end of the lateral part 22 and extends outward in a second direction L. Specifically, the lateral part 22 and the bottom 21 define a hollow cuboidal shape. The inner cuboidal cavity 2a is configured to accommodate the battery module 4. The protruding portion 23 is trapezoidal, on which electronic components may be disposed to control working modes such as charging mode and discharging mode of the battery module 4.

As can be seen from FIG. 2, an overall shape of the box cover 1 adapts to the box body 2, and includes a rectangular portion and a trapezoidal part. The rectangular portion includes a top plate 11 and a side plate 12 that is connected to a circumference of the top plate 11 and that extends downward. The trapezoidal portion is connected to one end of the side plate 12, and extends outward in the second direction L to form a flange 13.

When the box cover 1 fits snugly on the box body 2, the side plate 12 of the box cover 1 fits the lateral part 22 of the box body 2, and a flange 13 of the box cover 1 fits the protruding portion 23 of the box body 2 to close off the cavity 2a.

When the accommodation box is disposed on a vehicle body, the box cover 1 faces upward, and a side where the protruding portion 23 and the flange 13 are located is disposed near the front of the vehicle. To be specific, when the battery pack is mounted on the vehicle, the height direction H is along a height direction of the vehicle body, and the second direction L is along a length direction of the vehicle body and a headway direction of the vehicle.

Figure 3:
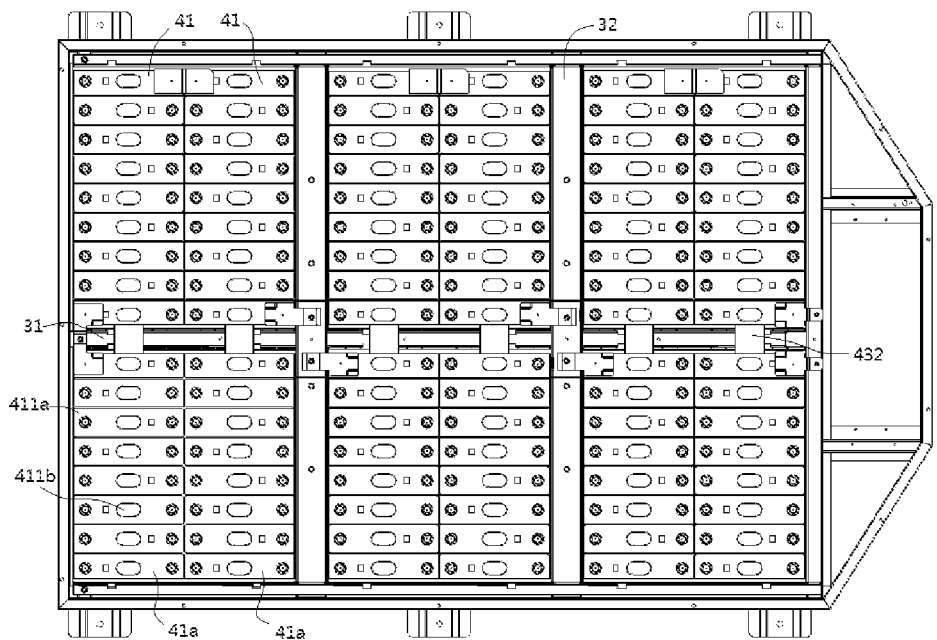
FIG. 3 is a top view of the structure in FIG. 2 with a first shielding portion omitted.

Disposed in the cavity 2a, the battery module 4 is a core component of the battery pack and is configured to provide electrical energy to the vehicle. As shown in FIG. 1 and FIG. 3, in this embodiment, the battery module 4 includes 6 battery rows 41. The 6 battery rows 41 are arranged alongside in the second direction L.

In order to simplify the structure, structures of all battery rows 41 in this embodiment are identical. Therefore, the following describes the structure of merely one of the battery rows 41.

As shown in FIG. 3, the battery row 41 includes a plurality of batteries 411. Each battery 411 includes a top cover 411a and an explosion-proof valve 411b disposed on the top cover 411a. When the battery 411 is thermally runaway, the explosion-proof valve 411b may be burst open by gas, heat, flames and other high-temperature and high-pressure fluids (collectively referred to as gas) generated inside the battery 411. In this way, the gas is expelled out of the battery 411, and the pressure inside the battery 411 is released from the top cover 411a.

All the batteries 411 in the battery row 41 are arranged alongside and face an identical direction. In FIG. 1 and FIG. 3, all the batteries 411 in the battery row 41 are arranged vertically. The height direction H of the battery row is along a vertical direction, and is consistent with the height direction of the box body 11. All the top covers 411a face upward. In other words, all the top covers 411a are arranged toward the box cover 1 and back from the box body 2. In addition, all the batteries 411 in the battery row 41 are arranged alongside in the first direction W to form a row.

It needs to be noted that the quantity of battery rows 41 in the battery module 4 is not limited to 6. In fact, the battery module 4 may include one or at least two battery rows 41. When at least two battery rows 41 are included, all the battery rows 41 are arranged alongside in the second direction L.

As mentioned above, the battery pack according to this embodiment includes a plurality of battery rows 41. The quantity of batteries 411 in each battery row 41 is more than one. Therefore, the battery pack contains a plurality of batteries 411, and the plurality of batteries 411 are arranged in rows and columns to form a battery array that includes a plurality of rows and columns.

To stow the plurality of batteries 411 more orderly in the battery pack, as shown in FIG. 1 and FIG. 3, the battery pack may further include a partition structure 3. The partition structure 3 is disposed in the cavity 2a and partitions the cavity 2a into at least two accommodation regions 2b. The batteries 411 in the battery pack are arranged in groups in different accommodation regions 2b. In this way, batteries 411 in each different group are accommodated in a different accommodation region 2b, thereby being more orderly and making it convenient to stow the batteries. Moreover, the batteries 411 in different groups can be positioned more reliably by using the partition structure 3.

As can be seen from FIG. 1 and FIG. 3, the partition structure 3 in this embodiment includes a first partition piece 31. The first partition piece 31 extends in the second direction L, and partitions the cavity 2a into different accommodation regions 2b arranged along the first direction W. In addition, the partition structure 3 further includes a second partition piece 32. The second partition piece 32 extends in the first direction W, and intersects the first partition piece 31. In this way, the second partition piece 32 further partitions the accommodation regions 2b that are formed by partitioning by the first partition piece 31. Therefore, more accommodation regions 2b exist in the cavity 2a. The accommodation regions 2b not only include the accommodation regions 2b arranged along the first direction W, but also include the accommodation regions 2b arranged along the second direction L.

When the batteries 411 are placed in groups in the cavity 2a, different battery rows 41 may be accommodated in groups in different accommodation regions 2b arranged along the second direction L, so that the battery rows 41 in each different group are stowed in a different region. In addition, the batteries 411 in the same battery row 41 are accommodated in groups along the first direction W into different accommodation regions 2b that are arranged along the first direction W, so that the batteries inside the same battery row 41 are stowed in different regions along the first direction W.

Specifically, in the illustrated embodiment, as can be seen from FIG. 3, the partition structure 3 includes one first partition piece 31 and two second partition pieces 32. The two second partition pieces 32 are arranged alongside in the second direction L and are spaced apart from each other. The first partition piece 31 is perpendicular to both second partition pieces 32. In this way, under the action of the first partition piece 31 and the second partition piece 32, the partition structure 3 partitions the cavity 2a into a total of 6 accommodation regions 2b laid out in 2 rows and 3 columns. The 6 battery rows 41 arranged alongside in the second direction L are partitioned by the 2 second partition pieces 32, where the battery rows 41 are located in pairs on the same side of each of the two second partition pieces 32. In the first direction W, the battery rows 41 are further partitioned by one first partition piece 31. That is, the first partition piece 31 is located between two batteries 411 adjacent along the first direction W in the battery row 41. In this way, each battery row 41 is further partitioned by the first partition piece 31 into the first battery row 41a and the second battery row 41b arranged along the first direction W. Therefore, the first battery row 41a and the second battery row 41b in the same battery row 41 are also in different accommodation regions 2b.

More specifically, as shown in FIG. 3, in this embodiment, the first partition piece 31 is located in the middle of the battery rows 41 along the first direction W, so that the quantity of the batteries 411 in the first battery row 41a is equal to that in the second battery row 41b.

Understandably, the quantities of the first partition pieces 31 and the second partition pieces 32 as well as the position of the first partition piece 31 are not limited to those shown in FIG. 3. For example, the quantity of the first partition piece 31 may be at least two. For another example, the quantity of the second partition pieces 32 may vary with the quantity of groups of the battery rows 41, and is usually less than the quantity of groups of the battery rows 41 by one. When the quantity of the second partition pieces 32 is at least two, the second partition pieces 32 are arranged alongside in the second direction L and are spaced apart from each other. For another example, the first partition piece 31 may be located not in the middle of the battery row 41 in the first direction W, but near a side in the first direction W. In this case, the quantity of the batteries 411 in the first battery row 41a is not equal to that in the second battery row 41b.

The first partition piece 31 and the second partition piece 32 may be beam structures. In FIG. 3, the first partition piece 31 may be referred to as a longitudinal beam, and the second partition piece 32 may be referred to as a cross beam. In addition, both the first partition piece 31 and the second partition piece 32 are fixedly connected to the box body 2. Specifically, both the first partition piece 31 and the second partition piece 32 are fixedly connected to the bottom 21 of the box body 2.

Moreover, as can be seen from FIG. 1, in this embodiment, along the height direction H, an upper surface of the first partition piece 31 is not flush with an upper surface of the top cover 411a of the battery 411, but is lower than the upper surface of the top cover 411a. In this case, a recess S is formed between the battery row 41 and the first partition piece 31. Specifically, the recess S is located between the upper surface of the top cover 411a of the first battery row 41a, the upper surface of the top cover 411a of the second battery row 41b, and the upper surface of the first partition piece 31. The recess S may accommodate a signal collection wire configured to electrically connect the batteries 411 in each accommodation region 2b, so as to implement collection and transmission of temperature or voltage signals of each battery 411.

As mentioned above, when the battery 411 is thermally runaway, the generated gas is expelled from the explosion-proof valve 411b on the top cover 411a. If the generated gas ejected from the explosion-proof valve 411b is not guided, a flow direction and a spread scope of the generated gas are not controllable, and the gas flows in the height direction H, the first direction W, and the second direction L. However, when flowing upward, the gas will directly impact passengers above the battery pack, and threaten safety of the passengers. When flowing in the second direction L, the gas may cause failure of other battery rows 41, and additionally, may flow to a space under the front of the vehicle to aggravate hazards to the passengers. Moreover, in this embodiment, a recess S exists between the first battery row 41a, the second battery row 41b, and the first partition piece 31. The gas may further flow downward into the recess S to burn out the signal collection wire in the recess S, and even to cause secondary hazards such as a short circuit.

Therefore, to protect the battery pack and the passengers against the gas ejected by the explosion-proof valve 411b, the battery pack according to this embodiment further includes a shielding member 43. The shielding member 43 is configured to directionally guide the gas released by the explosion-proof valve 411b, and guide the gas from the anti-explosion valve 411b to stop being expelled upward, downward, or along the second direction L. Instead, the gas is guided to be expelled mainly along the first direction W, thereby reducing risks of thermal runaway, improving safety performance of the battery pack, and enhancing the safety of the passengers.

The quantity of the shielding members 43 is identical to the quantity of the battery rows 41, and are arranged above the battery rows 41 in one-to-one correspondence to the battery rows 41. Specifically, as shown in FIG. 1, corresponding to the 6 battery rows 41, the quantity of the shielding members 43 is also 6, and the shielding members 43 are arranged in one-to-one correspondence with the battery rows 41. In this way, by means of each shielding member 43, the gas released by the explosion-proof valve 411b of the corresponding battery row 41 can be guided to be expelled along the first direction W.

In this embodiment, structures of all the shielding members 43 are identical, and each include a first shielding portion 431 and a second shielding portion 432. The first shielding portion 431 overlays all the explosion-proof valves 411b in the battery row 41. A passage P is disposed between the first shielding portion 431 and the upper surface of the top cover 411a. The passage P is configured to guide the gas to flow along the first direction W, and is provided with a downward opening O. The second shielding portion 432 closes off a part of the opening O, the part facing the recess S directly.

The first shielding portion 431 can prevent the gas of the battery row 41 from flowing upward or along the second direction L. In addition, the second shielding portion 432 is disposed to close off the part of the downward opening O of the passage P, the part facing the recess S directly, so that the gas from the explosion-proof valve 411b stops flowing down into the recess S. Therefore, the shielding member 43 according to this embodiment prevents the gas from spreading to regions outside the passage P, more reliably guides the gas to flow along the first direction W in the passage P, improves the safety of the battery pack in use, prevents the gas from directly impacting the passengers above, and enhances the safety of the vehicle.

In addition, the second shielding portion 432 is disposed to close off the part of the downward opening O of the passage P, the part facing the recess S directly, so that the gas from the explosion-proof valve 411b is prevented from flowing into recess S. This prevents the gas from burning out the signal collection wire in the recess S or flowing to other regions, effectively reduces the secondary hazards such as a short-circuit, and further enhances the safety performance of the battery pack.

Figure 4:
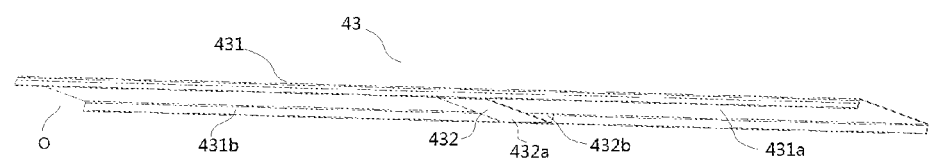
FIG. 4 is a schematic bottom view of the structure of the shielding member shown in FIG. 2.

Specifically, as shown in FIG. 4, the first shielding portion 431 includes a body plate 431a and two bent plates 431b. The body plate 431a extends along the first direction W. That is, the body plate 431a extends along an arrangement direction of the batteries 411 in the battery row 41. The two bent plates 431b are connected to two opposite ends of the body plate 431a along the second direction L respectively, and are both bent downward against the body plate 431a (that is, toward a direction near the battery row 41). Based on this, the two bent plates 431b support the body plate 431a above the battery row 41. A passage P extending along the first direction W is formed between the body plate 431a, the two bent plates 431b, and the upper surface of the top cover 411a of the battery row 41. The top of the passage P and two sides along the second direction L are closed off. Although a downward opening O exists at a lower part of the passage P, a majority of the opening O is also closed off by the upper surface of the top cover 411a of the battery row 41. Merely the two ends along the first direction W and a part of the opening O are open, the part facing the recess S directly.

The second shielding portion 432 includes a base plate 432a. The base plate 432a closes off a part of the opening O, the part facing the recess S directly. In this way, the part of the opening O, which faces the recess S directly, is not open, and the gas from the explosion-proof valve 411b is unable to enter the recess S to damage the signal collection wire in the recess S or to flow to other regions, thereby effectively avoiding secondary hazards such as a short circuit. In addition, the body plate 431a and the bent plates 431b of the first shielding portion 431 serves to close off the top of the passage P and the two sides along the second direction L. Therefore, the passage P is open merely at the two ends along the first direction W. In this way, under the joint action of the first shielding portion 431 and the second shielding portion 432, the gas bursting from the explosion-proof valve 411b of the battery 411 is unable to flow upward or flow out along the second direction L, and is unable to flow into the recess S, but can flow out along the first direction W. In a case of mounting in the vehicle body, the first direction W is along the width direction of the vehicle body, not the headway direction or the upward direction where the passengers are located. Therefore, with the gas being guided to be expelled in the width direction of the vehicle body, the gas can be expelled safely, and the safety threat of the gas to the passengers is reduced.

To fix the base plate 432a, the base plate 432a may be directly connected to the first shielding portion 431. For example, the base plate 432a may be directly connected to the two bent plates 431a. Alternatively, the second shielding portion 432 may further include an extension plate 432b. The extension plate 432b extends upward from the base plate 432a, and is connected to the first shielding portion 431, so that the base plate 432a can be connected to the first shielding portion 431 through the extension plate 432b. In an implementation manner, the second shielding portion 432 may include two extension plates 432b. The two extension plates 432b are connected to two opposite ends of the base plate 432a along the second direction L respectively, and are both bent upward against the base plate 432a. In addition, the two extension plates 432b are both connected to the first shielding portion 431. For example, the two extension plates 432a may be connected to the two bent plates 431b of the first shielding portion 431 respectively to fix the base plate 432a more steadily.

Specifically in FIG. 4, the two extension plates 432b are both located in the passage P, and are connected to the corresponding bent plates 431b respectively. In this way, the base plate 432a can be connected to inner lateral surfaces of the two bent plates 431b through the two extension plates 432b. Alternatively, at least one of the two extension plates 432b may be located outside the passage P.

The body plate 431a and the bent plates 431b may be any of various plate structures such as a flat plate, a curved plate, or a special-shaped plate. A cross section of the first shielding portion 431 (that is, a section perpendicular to the first direction W) may be in any of various shapes such as an inverted U shape or an M shape. For example, in FIG. 3, the cross section of the first shielding portion 431 is in an inverted U shape. Compared with other shapes, the inverted U shape simplifies the structure of the first shielding portion 431 and facilitates processing.

The base plate 432a and the extension plate 432b may also be any of various plate structures such as a flat plate, a curved plate, or a special-shaped plate. A cross section of the second shielding portion 432 (that is, the section perpendicular to the first direction W) may be in any of various shapes such as a U shape or a W shape. For example, in FIG. 4, the cross section of the second shielding portion 432 is in a U shape. Compared with other shapes, the U shape simplifies the structure of the second shielding portion 432 and facilitates processing. Moreover, the U shape facilitates connecting to the inverted-U-shaped first shielding portion 431, helps to fix the second shielding portion 432 more steadily, and helps to close off a part of the opening O more airtightly, the part facing the recess S directly.

To limit the position of the shielding member 43 conveniently, the shielding member 43 may be connected to the box cover 1, for example, may be welded to the top plate 11 through the body plate 431a, so as to implement the mounting and fixing of the shielding member 43 and facilitate the shielding member 43 to more reliably overlay all explosion-proof valves 411b in the battery row 41. Compared with other shapes such as an M shape of the cross section of the shielding member 43, the shielding member 43 with an inverted-U-shaped cross section facilitates firmer welding to the top plate 11 because closer contact is implemented between the body plate 431a and the top plate 11 due to a larger contact area.

As can be learned from the foregoing, the second shielding portion 432 is disposed on the basis of the first shielding portion 431, so that the gas bursting from inside the battery 411 can be prevented from spreading to regions outside the passage P when the gas flows in the passage P. In this way, under the coordination of the first shielding portion 431 and the second shielding portion 432, the gas can flow smoothly along the first direction W to the two ends in the first direction W of the accommodation box, and can be expelled from the two ends in the first direction W of the accommodation box. This can more effectively exert the directional gas guiding function of the shielding member 43 and more effectively implement the function of preventing heat spreading.

To further facilitate expulsion of the gas out of the accommodation box, as shown in FIG. 1, in this embodiment, an explosion-proof exhaust structure 121 is disposed on at least one of two opposite side plates 12 of the box cover 1, where the two side plates are opposite to each other in the first direction W. The explosion-proof exhaust structure 121 communicates with the passage P and is configured to expel a fluid in the passage P out of the battery pack. The explosion-proof exhaust structure 121 may include an explosion-proof valve. For example, a mounting hole may be disposed on the side plate 12, and the explosion-proof valve is mounted in the mounting hole. Alternatively, the explosion-proof exhaust structure 121 may include a fragile portion. The fragile portion is a part of the side plate 12, and a strength of the fragile portion is lower than that of other parts of the side plate 12. For example, the fragile portion may be a groove or a notch on the side plate 12.

The explosion-proof exhaust structure 121 disposed on the side plate 12 located in the first direction W enables the gas guided by the passage P to be easily expelled through the explosion-proof exhaust structure 121. The gas can be expelled more smoothly. The explosion-proof exhaust structure 121 controls the expulsion of the gas to some extent, for example, controls the gas in such a way that the gas is not expelled until the gas reaches a preset pressure, thereby helping to further enhance the safety of the battery pack.

In conclusion, in this application, the shielding member 43 serves to directionally guide the gas more effectively, and more reliably guide the gas to be directionally expelled along the desired first direction W to the explosion-proof exhaust structure 121 located on the side plate 12. In this way, the high temperature and high pressure inside the battery 411 are released in time in a case of thermal runaway, the gas is prevented from spreading to undesired regions, the hazards of thermal runaway are reduced, the safety of the battery pack in use is enhanced, and safety hazards to the passengers in the vehicle equipped with the battery pack are reduced.

The foregoing descriptions are merely exemplary embodiments of this application, but are not intended to limit this application. Any modifications, equivalent substitutions, and improvements made within the spirit and principles of this application shall fall within the protection scope of this application.

What is claimed is:

1. A battery pack, comprising:
   a box body;
   a battery row, disposed in the box body, wherein the battery row comprises a plurality of batteries arranged alongside in a first direction, explosion-proof valves are disposed on a top cover of the batteries, a recess is formed between two batteries adjacent to each other in the first direction in the battery row and the first direction is perpendicular to a height direction of the plurality of batteries; and
   a shielding member, comprising a first shielding portion and a second shielding portion, wherein the first shielding portion is configured to overlay all the explosion-proof valves of the battery row, a passage is disposed between the first shielding portion and the upper surface of the top cover, the passage is configured to guide a fluid to flow along the first direction and is provided with a downward opening, and the second shielding portion is configured to close off a part of the opening, the part facing the recess directly, so as to directionally guide a gas released by the explosion-proof valve;
   wherein the second shielding portion comprises a base plate, and the base plate is configured to close off a part of the opening, the part facing the recess directly;
   the second shielding portion further comprises an extension plate, and the extension plate is configured to extend upward from the base plate and is connected to the first shielding portion;
   wherein a signal collection wire of the battery is accommodated in the recess.

2. The battery pack according to claim 1, wherein the battery pack further comprises a partition structure which is disposed in a cavity arranged in the box body and configured to partition the cavity into at least two accommodation regions, wherein the partition structure comprises a first partition piece, the battery row is disposed in the partition structure, the first partition piece is located between the two batteries adjacent to each other in the first direction in the battery row, an upper surface of the first partition piece is lower than an upper surface of the top cover in the height direction, and the recess is formed between the battery row and the first partition piece.

3. The battery pack according to claim 1, wherein the first shielding portion comprises a body plate and two bent plates, the two bent plates are connected to two opposite ends of the body plate along a second direction respectively and are both bent downward against the body plate, the passage is located between the body plate, the two bent plates, and the upper surface of the top cover, and the second direction is perpendicular to the first direction and the height direction.

4. The battery pack according to claim 3, wherein a cross section of the first shielding portion is in an inverted U shape.

5. The battery pack according to claim 1, wherein the second shielding portion comprises two extension plates, the two extension plates are connected to two opposite ends of the base plate along a second direction respectively and are both bent upward against the base plate, the two extension plates are both connected to the first shielding portion, and the second direction is perpendicular to the first direction and the height direction.

6. The battery pack according to claim 5, wherein the two extension plates are connected to the two bent plates of the first shielding portion respectively.

7. The battery pack according to claim 5, wherein a cross section of the second shielding portion is in a U shape.

8. The battery pack according to claim 1, wherein the battery pack further comprises a box cover, the box cover is configured to fit on a top of the box body, an explosion-proof exhaust structure is disposed on at least one of two opposite side plates of the box cover, the two side plates are opposite to each other in the first direction, and the explosion-proof exhaust structure is configured to communicate with the passage and is configured to expel a fluid, which flows out of the passage, out of the battery pack.

9. The battery pack according to claim 8, wherein the explosion-proof exhaust structure comprises an explosion-proof valve or a fragile portion, the fragile portion is a part of the side plate, and a strength of the fragile portion is lower than that of other parts of the side plate.

10. The battery pack according to claim 1, wherein the battery pack further comprises a box cover, the box cover is configured to fit on the top of the box body, and the first shielding portion is connected to the box cover.

11. The battery pack according to claim 2, wherein the partition structure further comprises a second partition piece, the second partition piece is configured to intersect the first partition piece, and the second partition piece and the first partition piece jointly are configured to partition the cavity into the at least two accommodation regions.

12. A vehicle, comprising:
    a power source, wherein the power source provides power to the vehicle; and
    a battery pack, wherein the battery pack is configured to provide electrical power to the power source, and the battery pack comprises:
    a box body;
    a battery row, disposed in the box body, wherein the battery row comprises a plurality of batteries arranged alongside in a first direction, explosion-proof valves are disposed on a top cover of the batteries, a recess is formed between two batteries adjacent to each other in the first direction in the battery row and the first direction is perpendicular to a height direction of the plurality of batteries; and
    a shielding member, comprising a first shielding portion and a second shielding portion, wherein the first shielding portion is configured to overlay all the explosion-proof valves of the battery row, a passage is disposed between the first shielding portion and the upper surface of the top cover, the passage is configured to guide a fluid to flow along the first direction and is provided with a downward opening, and the second shielding portion is configured to close off a part of the opening, the part facing the recess directly, so as to directionally guide a gas released by the explosion-proof valve;

wherein the second shielding portion comprises a base plate, and the base plate is configured to close off a part of the opening, the part facing the recess directly;

the second shielding portion further comprises an extension plate, and the extension plate is configured to extend upward from the base plate and is connected to the first shielding portion;

wherein a signal collection wire of the battery is accommodated in the recess.

* * * * *